(12) United States Patent
Tang

(10) Patent No.: US 8,154,167 B2
(45) Date of Patent: *Apr. 10, 2012

(54) INDUCTION MOTOR LAMINATION DESIGN

(75) Inventor: Yifan Tang, Los Altos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/074,841

(22) Filed: Mar. 29, 2011

(65) Prior Publication Data

US 2011/0198962 A1    Aug. 18, 2011

Related U.S. Application Data

(63) Continuation-in-part of application No. 12/707,699, filed on Feb. 18, 2010, now Pat. No. 8,069,555.

(51) Int. Cl.
*H02K 1/00* (2006.01)
*H02K 2/28* (2006.01)

(52) U.S. Cl. ........... 310/216.069; 310/184; 310/216.074

(58) Field of Classification Search .................. 310/166, 310/211, 216.069, 216.074, 180, 184, 198, 310/206–208

See application file for complete search history.

(56) References Cited

U.S. PATENT DOCUMENTS

| | | | |
|---|---|---|---|
| 4,644,210 A * | 2/1987 | Meisner et al. ............... | 310/211 |
| 5,182,483 A * | 1/1993 | Hibino et al. ................. | 310/211 |
| 5,753,991 A | 5/1998 | Couture et al. | |
| 5,793,139 A | 8/1998 | Nashiki | |
| 6,034,460 A | 3/2000 | Tajima et al. | |
| 6,133,663 A | 10/2000 | Hoemann | |
| 6,144,132 A | 11/2000 | Nashiki | |
| 6,170,974 B1 | 1/2001 | Hyypio | |
| 6,218,760 B1 | 4/2001 | Sakuragi et al. | |
| 6,359,361 B1 * | 3/2002 | Wakui et al. .................. | 310/179 |
| 6,465,923 B2 * | 10/2002 | Amrhein ...................... | 310/90.5 |
| 6,570,290 B2 | 5/2003 | Kazmierczak | |
| 6,747,387 B2 | 6/2004 | Fujinaka | |
| 6,750,583 B2 | 6/2004 | Fujinaka | |
| 6,768,411 B2 | 7/2004 | Luttrell | |
| 6,806,614 B2 * | 10/2004 | Kuroyanagi et al. ......... | 310/215 |
| 7,098,567 B2 | 8/2006 | Ionel et al. | |
| 7,116,029 B2 | 10/2006 | Kerlin | |
| 7,141,905 B2 | 11/2006 | Vollmer | |
| 7,247,967 B2 | 7/2007 | Ionel et al. | |
| 7,252,118 B2 | 8/2007 | Reid | |
| 7,466,055 B2 | 12/2008 | Toide et al. | |
| 7,741,750 B1 | 6/2010 | Tang | |
| 8,008,827 B1 * | 8/2011 | Tang et al. .................... | 310/184 |
| 2005/0134137 A1 * | 6/2005 | Sweo ............................ | 310/211 |
| 2011/0198963 A1 * | 8/2011 | Tang et al. .................... | 310/208 |

OTHER PUBLICATIONS

W. Ouyang et al., Analysis of Optimal Stator Concentric Winding Patterns Design, Proceedings of the Eighth International Conference on Electrical Machines and Systems, Sep. 27-29, 2005, vol. 1, pp. 94-98.

* cited by examiner

*Primary Examiner* — Tran Nguyen

(74) *Attorney, Agent, or Firm* — Patent Law Office of David G. Beck

(57) ABSTRACT

A high efficiency, high torque density, high speed induction motor is provided, the motor utilizing (i) stator teeth with parallel side surfaces; (ii) rotor teeth with parallel side surfaces; (iii) wide open stator slots; (iv) closed rotor slots with thick tooth bridges; and (v) deep stator and rotor slots.

18 Claims, 18 Drawing Sheets

1st Layer

Slot

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | A1 | A1 | | | | | | | B4 | B4 | | | | A1 | A1 | A2 | A2 | | | | C1 | C1 | | | | | | | A2 | A2 |
| Lower | A1 | A1 | A1 | | | | | B4 | B4 | B4 | | | A1 | A1 | A1 | A2 | A2 | A2 | | | C1 | C1 | C1 | | | | | A2 | A2 | A2 |

Slot

| | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | | | | C1 | C1 | C2 | C2 | | | | B3 | B3 | | | | | | | C2 | C2 | | | | B3 | B3 | B4 | B4 | | | |
| Lower | | | C1 | C1 | C1 | C2 | C2 | C2 | | | B3 | B3 | B3 | | | | | C2 | C2 | C2 | | | B3 | B3 | B3 | B4 | B4 | B4 | | |

---

2nd Layer (in bold & italics)

Slot

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | A1 | A1 | *C3* | *C3* | *C3* | *C4* | *C4* | *C4* | B4 | B4 | *B1* | *B1* | *B1* | A1 | A1 | A2 | A2 | *C4* | *C4* | *C4* | C1 | C1 | *B1* | *B1* | *B1* | *B2* | *B2* | *B2* | A2 | A2 |
| Lower | A1 | A1 | A1 | *C3* | *C3* | *C4* | *C4* | B4 | B4 | B4 | *B1* | *B1* | A1 | A1 | A1 | A2 | A2 | A2 | *C4* | *C4* | C1 | C1 | C1 | *B1* | *B1* | *B2* | *B2* | A2 | A2 | A2 |

Slot

| | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | *A3* | *A3* | *A3* | C1 | C1 | C2 | C2 | *B2* | *B2* | *B2* | B3 | B3 | *A3* | *A3* | *A3* | *A4* | *A4* | *A4* | C2 | C2 | *C3* | *C3* | *C3* | B3 | B3 | B4 | B4 | *A4* | *A4* | *A4* |
| Lower | *A3* | *A3* | C1 | C1 | C1 | C2 | C2 | C2 | *B2* | *B2* | B3 | B3 | B3 | *A3* | *A3* | *A4* | *A4* | C2 | C2 | C2 | *C3* | *C3* | B3 | B3 | B3 | B4 | B4 | *A4* | *A4* | *A4* |

FIG. 7

| Phase A | | | | | | Phase B | | | | | | Phase C | | | | |
|---|---|---|---|---|---|---|---|---|---|---|---|---|---|---|---|---|
| | Coil | Go | Ret | Span | Turns | | Coil | Go | Ret | Span | Turns | | Coil | Go | Ret | Span | Turns |
| A1 | 1 | 1 | 15 | 14 | 2 | B1 | 1 | 11 | 25 | 14 | 2 | C1 | 1 | 21 | 35 | 14 | 2 |
| | 2 | 2 | 14 | 12 | 2 | | 2 | 12 | 24 | 12 | 2 | | 2 | 22 | 34 | 12 | 2 |
| | 3 | 3 | 13 | 10 | 1 | | 3 | 13 | 23 | 10 | 1 | | 3 | 23 | 33 | 10 | 1 |
| A2 | 4 | 30 | 16 | -14 | 2 | B2 | 4 | 40 | 26 | -14 | 2 | C2 | 4 | 50 | 36 | -14 | 2 |
| | 5 | 29 | 17 | -12 | 2 | | 5 | 39 | 27 | -12 | 2 | | 5 | 49 | 37 | -12 | 2 |
| | 6 | 28 | 18 | -10 | 1 | | 6 | 38 | 28 | -10 | 1 | | 6 | 48 | 38 | -10 | 1 |
| A3 | 7 | 31 | 45 | 14 | 2 | B3 | 7 | 41 | 55 | 14 | 2 | C3 | 7 | 51 | 5 | 14 | 2 |
| | 8 | 32 | 44 | 12 | 2 | | 8 | 42 | 54 | 12 | 2 | | 8 | 52 | 4 | 12 | 2 |
| | 9 | 33 | 43 | 10 | 1 | | 9 | 43 | 53 | 10 | 1 | | 9 | 53 | 3 | 10 | 1 |
| A4 | 10 | 60 | 46 | -14 | 2 | B4 | 10 | 10 | 56 | -14 | 2 | C4 | 10 | 20 | 6 | -14 | 2 |
| | 11 | 59 | 47 | -12 | 2 | | 11 | 9 | 57 | -12 | 2 | | 11 | 19 | 7 | -12 | 2 |
| | 12 | 58 | 48 | -10 | 1 | | 12 | 8 | 58 | -10 | 1 | | 12 | 18 | 8 | -10 | 1 |

FIG. 8

INDUCTION MOTOR LAMINATION DESIGN

CROSS-REFERENCES TO RELATED APPLICATIONS

This application is a continuation-in-part of U.S. patent application Ser. No. 12/707,699, filed Feb. 18, 2010, the disclosure of which is incorporated herein by reference for any and all purposes.

FIELD OF THE INVENTION

The present invention relates generally to electric motors and, more particularly, to a lamination design that achieves improved flux distribution for improved efficiency, torque density and high speed power.

BACKGROUND OF THE INVENTION

The trend towards designing and building fuel efficient, low or zero emission on-road and off-road vehicles has increased dramatically in recent years, with significant emphasis being placed on the development of hybrid and all-electric vehicles. This has led, in turn, to a greater emphasis being placed on electric motors, either as the sole source of propulsion (e.g., all-electric vehicles) or as a secondary source of propulsion in a combined propulsion system (e.g., hybrid or dual electric motor vehicles). The electric motor in such an application may utilize either an AC or DC permanent magnet motor design or an AC induction motor design. Regardless of the type of electric motor, it must be designed to achieve the desired efficiency, torque density and high speed torque with an acceptable motor size and weight.

In a multi-phase AC induction motor, a rotating magnetic field is generated by a plurality of circumferentially distributed multi-phase coil windings secured within a plurality of circumferentially distributed slots in the inner periphery of the motor's stator, the coil windings being coupled to a multi-phase AC power source controlled with certain desired frequencies and certain desired levels of voltage or current in each phase. The magnetic field generated within the stator core induces multiple-phase alternating currents in the rotor windings which in turn interact with the stator magnetic field. The resultant rotating field causes the desired shaft torque and rotation of the motor's rotor at the desired speed, the rotor being comprised of one or more magnetic pole pairs with the same number of pole-pairs as that of the stator windings of each phase.

For decades AC induction motors have been the workhorses of modern society, such motors being designed and manufactured with a variety of characteristics to match the vast range of desired applications. In general, the various electrical, thermal and mechanical aspects of a motor are designed to meet the performance specifications and cost constraints for a specific application. On one end of the spectrum of applications economic considerations dominate, as exhibited by manufacturing and maintenance costs, such applications including appliances, factory process controls, and most other applications of induction motors. On the other end of the spectrum of applications performance dominates, where high performance requirements such as high power density and high dynamic response are met using specific materials and manufacturing processes, typically at higher costs. Some applications, however, require both high performance and low cost. For example, electric vehicles have very demanding performance requirements, e.g., high efficiency, high torque density, high power factor and drive converter utilization, wide constant power range at high speeds, high speed torque capability, high maximum speed, while also requiring that the resultant motors achieve high reliability, small size, low weight, mass manufacturability and low cost.

Accordingly, what is needed is a low cost and easily manufactured electric motor which achieves the very demanding performance requirements of electric and hybrid vehicles. The present invention provides such a motor design.

SUMMARY OF THE INVENTION

The present invention provides an induction motor that includes a stator and a rotor. The stator is comprised of a stator yoke having a stator yoke thickness and a plurality of stator teeth extending radially inward toward the stator center axis, where the stator teeth have a common tooth length and where the tooth side surfaces for each stator tooth are parallel to one another. The rotor, mounted within the stator bore, is comprised of a rotor yoke having a rotor yoke thickness; a plurality of rotor teeth with a common rotor tooth length extending radially away from the rotor center axis, where the tooth side surfaces for each rotor tooth are parallel to one another; and a plurality of rotor slots interposed between the rotor teeth, where the top region of each rotor slot that is proximate to the stator is closed by a rotor tooth bridge. The ratio of the stator diameter to the stator length is preferably at least 1.5:1. The stator tooth side surfaces may further comprise an extended lip portion proximate to the stator bore, where the extended lip portions extend partially across the corresponding stator slot. The stator yoke thickness may be between 30% and 70% larger than the common stator tooth length. The rotor yoke thickness may be between 30% and 70% larger than said common rotor tooth length. The sum of the stator yoke thickness and the stator tooth length may be approximately equal to the sum of the rotor yoke thickness and the common rotor tooth length. The length of the stator teeth may be between 4 and 6 times the width of the stator teeth. The length of the rotor teeth may be between 4 and 6 times the width of the rotor teeth. Preferably the total number of rotor teeth is at least 15% higher than the total number of stator teeth. The ratio of the common stator tooth width to the common rotor tooth width may be between 1:1 and 1.2:1. The air gap distance between the stator bore and the rotor is preferably between 0.5 millimeters and 0.8 millimeters. The rotor tooth bridge thickness is preferably between 10% and 70% larger than the air gap distance. The stator preferably includes 60 teeth; the rotor preferably includes 74 teeth.

In another aspect, the induction motor of the invention may be a three-phase, four pole motor with a dual winding layer arrangement. The first winding layer may be comprised of six coil groups, and more specifically of a first and a second first phase coil group, a first and a second second phase coil group and a first and a second third phase coil group. The second winding layer may be comprised of a second set of six coil groups, and more specifically of a third and a fourth first phase coil group, a third and a fourth second phase coil group and a third and a fourth third phase coil group. The first and second first phase coil groups comprise a first pole pair of the first phase, the third and fourth first phase coil groups comprise a second pole pair of the first phase, the first and second second phase coil groups comprise a first pole pair of the second phase, the third and fourth second phase coil groups comprise a second pole pair of the second phase, the first and second third phase coil groups comprise a first pole pair of the third phase, and the third and fourth third phase coil groups comprise a second pole pair of the third phase. Preferably the first inter-pole connection electrically connecting the first and second first phase coil groups is formed automatically by using a continuous wire/wire bundle to form the first and second first phase coil groups; preferably the second inter-pole connection electrically connecting the first and second second phase coil groups is formed automatically by using a continuous wire/wire bundle to form the first and second second phase coil groups; preferably the third inter-pole connection electrically connecting the first and second third phase coil groups is formed automatically by using a continuous wire/wire bundle to form the first and second third phase coil groups; preferably the fourth inter-pole connection electrically connecting the third and fourth first phase coil groups is formed automatically by using a continuous wire/wire bundle to form the third and fourth first phase coil groups; preferably the fifth inter-pole connection electrically connecting the third and fourth second phase coil groups is formed automatically by using a continuous wire/wire bundle to form the third and fourth second phase coil groups; and preferably the sixth inter-pole connection electrically connecting the third and fourth third phase coil groups is formed automatically by using a continuous wire/wire bundle to form the third and fourth third phase coil groups. In a preferred configuration, each coil group is comprised of a plurality of coils (preferably five coils), with two of the plurality being double turn coils. In this configuration, preferably one of the double turn coils of each coil group is positioned in the outermost coil position and the other of the double turn coils of each coil group is positioned in a slot adjacent to the outermost coil position.

A further understanding of the nature and advantages of the present invention may be realized by reference to the remaining portions of the specification and the drawings.

BRIEF DESCRIPTION OF THE DRAWINGS

FIG. 7 provides the coil make-up for each winding layer of a preferred embodiment;

FIG. 8 provides the coil make-up for each phase of the preferred embodiment shown in FIG. 7;

DESCRIPTION OF THE SPECIFIC EMBODIMENTS

Figure 1:
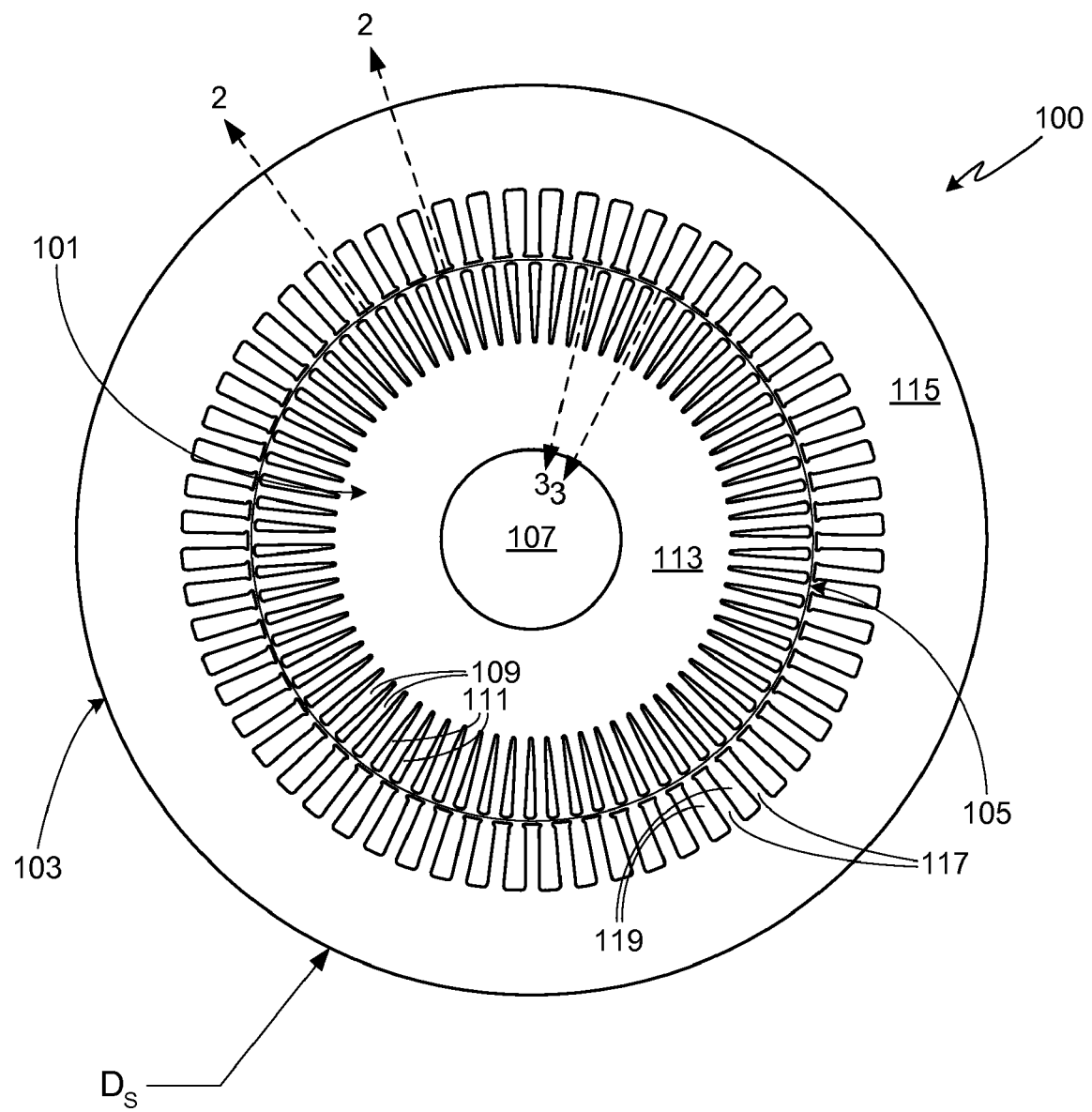
FIG. 1 provides a simplified axial view of an induction motor.

FIG. 1 shows an axial view of an induction motor 100 in accordance with the invention. The illustration provided in FIG. 1 is simplified for the sake of explanation, this view omitting windings and other components. As described in further detail below, the general characteristics of the illustrated geometry vary in a variety of ways from a conventional induction motor, such variances including, but not limited to, a radial air gap increased over the air gap size of a conventional motor, a shorter axial stack length of the plate stack, wide open stator slots, narrower stator teeth (e.g., tooth height in the range of 4 to 6 times the tooth width), parallel stator teeth, narrower rotor teeth (e.g., tooth height in the range of 4 to 6 times the tooth width), closed rotor slots with thick tooth bridges, parallel rotor teeth, higher stator and rotor yoke widths, an increased number of stator slots per pole per phase, and an increased number of rotor slots.

As shown, a rotor 101 is encircled by a stator 103, the two being separated by air gap 105. A shaft 107 is coupled to rotor 101, shaft 107 providing a means for coupling motor 100 to various devices and mechanisms, such as an axle, a gearbox and the like. The air gap 105 between the stator 103 and rotor 101 is sized to obtain the desired levels of the magnetizing inductance and the leakage inductances. Air gap 105 also affects the saturation levels and harmonic levels of the magnetic flux proximal the air gap. In at least one preferred embodiment, the air gap is between 0.5 millimeters and 0.8 millimeters.

Rotor 101 includes a plurality of rotor teeth 109. Between each tooth 109 and the tooth next to it (i.e., between each tooth pair), is a rotor slot 111, the teeth defining the slots between them. The rotor also has a rotor yoke 113. Stator 103 includes a stator yoke 115, a plurality of stator teeth 117, and stator slots 119 that are defined by the stator teeth 117. In various embodiments, the teeth and the yoke of the rotor are continuous blocks of material, i.e. monolithic. For example, in some embodiments, the rotor is comprised of a stack of plates electrically insulated from one another, each of the plates being stamped or otherwise excised from a single piece of material.

Figure 2:
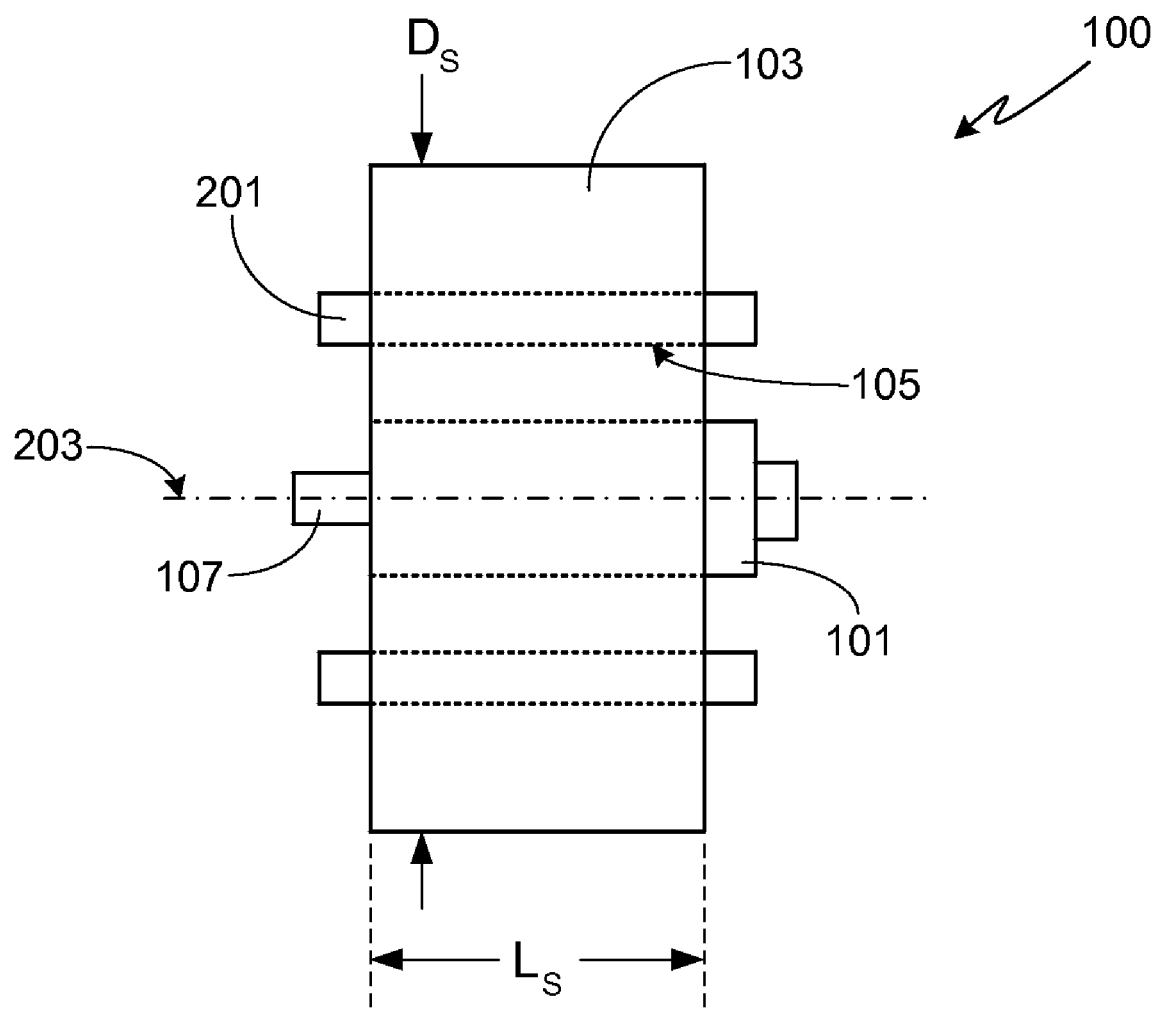
FIG. 2 provides a simplified side view of the induction motor shown in FIG. 1.

FIG. 2 shows a simplified side view of induction motor 100. The illustration shows the stator 103, rotor 101, air gap 105 and shaft 107. The illustration also shows end rings 201. Various embodiments include rotor bars, stator windings or coils including an electrical insulation system, a frame, end caps, bearings, and other components. Some embodiments include speed and temperature sensors.

In general, stator 103 is defined by a plurality of plates stacked along stator length $L_S$, each plate being electrically insulated from the adjacent plates. Preferably each plate comprising stator 103 is formed from a solid piece of material, the piece of material forming both stator teeth 117 and stator yoke 115. Preferably each stator plate is stamped or otherwise excised from a single block or sheet of suitable material, e.g., steel, and coated with an electrically insulating coating. Although the electrically insulating coating may be applied after the plate is stamped or otherwise formed, in the preferred embodiment it is applied before stamping/forming. Due to each plate being comprised of a metal plate with an electrically insulating material laminated to the plate surfaces, these plates are also referred to herein as laminates or laminations.

A plurality of windings is disposed around each of the stator teeth. In various embodiments the windings are copper, but other materials are possible. The windings define a plurality of poles, for example, a three-phase, four pole design. The preferred winding designs for the present motor are described more fully below.

Stator 103 is generally circular with a stator lamination outer diameter $D_S$ preferably greater than an axial stator stack length $L_S$. Preferably the stator diameter $D_S$ to axial stator length $L_S$ ratio is at least 1.5:1, such an aspect ratio having the potential of high peak torque per unit rotor volume as well as high peak torque per unit stator phase current. In addition, the radially larger and axially shorter stator lamination stack allows larger total winding slot area and a reduction in the winding phase resistances, which is critical in achieving low copper losses and high efficiency. Similarly, the corresponding shorter rotor stack also reduces rotor copper losses. Through these features as well as other aspects of the design described in detail below, gains in torque density and efficiency can be achieved that, to a large extent, overcome the negative effects brought by an accompanying increase in the end-winding resistances as well as end leakage inductances. The corresponding radially larger and axially shorter rotor stack also enhances the high speed operational capabilities of the motor by increasing rotor stiffness, allowing a larger shaft with increased stiffness, and reducing torsional vibrations and some other structural modes (e.g., shaft torque pulsations) that may otherwise propagate to the gears and the rest of the drivetrain. Effects of the accompanying increase in the centrifugal stresses of the larger rotor at the highest speed can be compensated by the other aspects of the improved design, as described further below.

Figure 3:
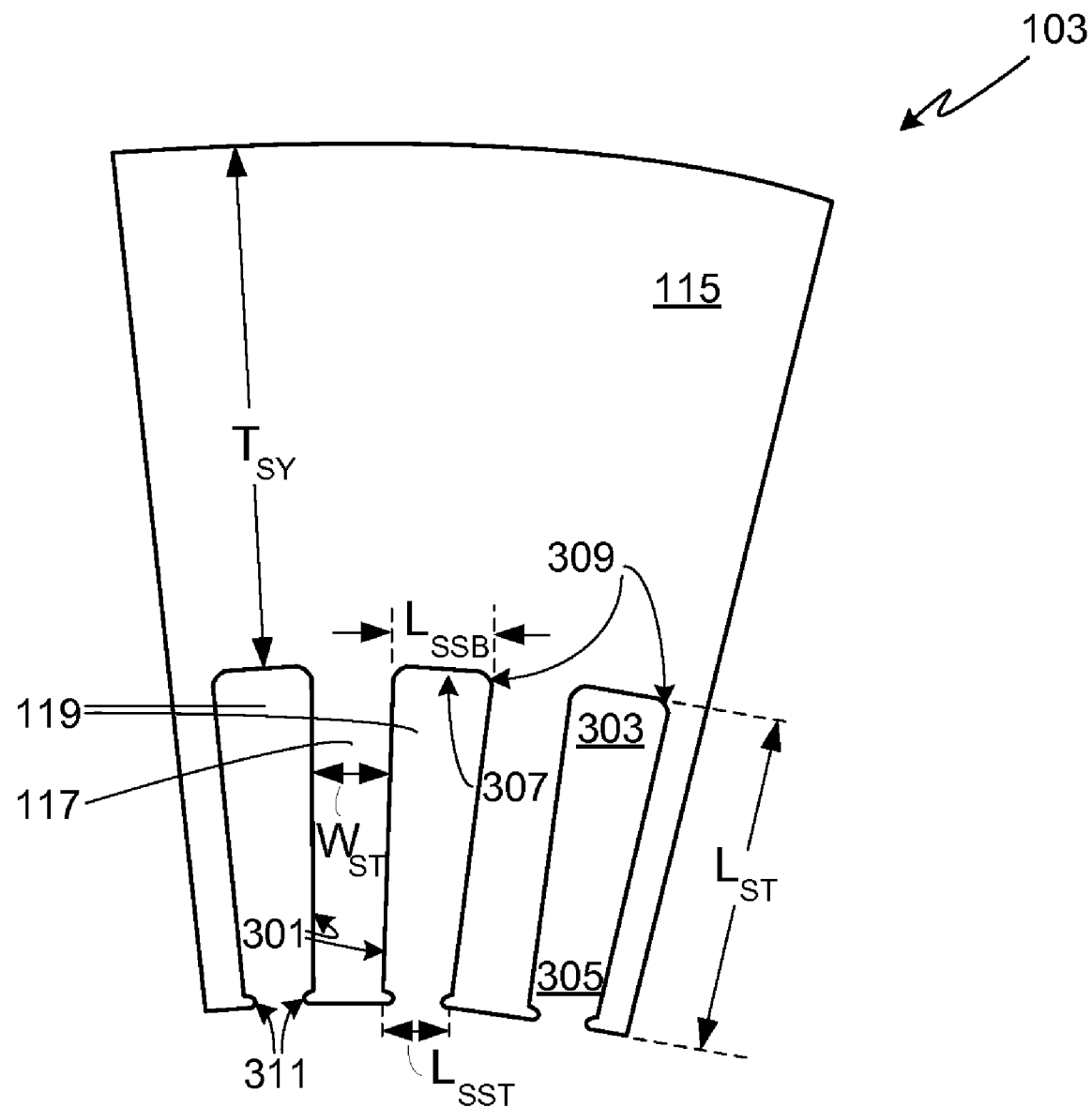
FIG. 3 shows a portion of the stator plate shown in FIG. 1.

FIG. 3 shows a portion of a stator plate, specifically the portion taken along line 2-2 in FIG. 1. The stator yoke 115 has a stator yoke thickness $T_{SY}$. A plurality of stator teeth 117 are coupled to stator yoke 115, stator teeth 117 extending radially inward toward the axis 203 of the stator bore. Stator teeth 117 have a common length $L_{ST}$. The side surfaces 301 of adjacent stator teeth are parallel to one another. Due to parallel teeth surfaces 301, slots 119 which are defined by teeth 117 are wider at the bottom of each slot than at the top, i.e., $L_{SSB} > L_{SST}$. Note that the common convention of referring to the region 303 of each slot proximal to the stator yoke 115 as the "bottom" of the slot and the region 305 of each slot proximal to the rotor 101 as the "top" of the slot is used herein. Preferably the bottom surface 307 of each slot is flat, or substantially flat, and the corners 309 that join bottom surface 307 to side surfaces 301 have a small radius. Alternately, bottom slot surface 307 may be entirely arcuate. In the preferred embodiment, each tooth 117 includes a lip portion 311 that may be used to help retain the windings within the slots 119. Alternately, lip portions 311 may be eliminated from teeth 117. The wide stator slot opening, in combination with other aspects of the lamination and winding design, allows the reduction of stator and rotor leakage fluxes, improves the high speed torque capability, and facilitates stator winding automated manufacturing processes for mass production of the improved motor.

Figure 4:
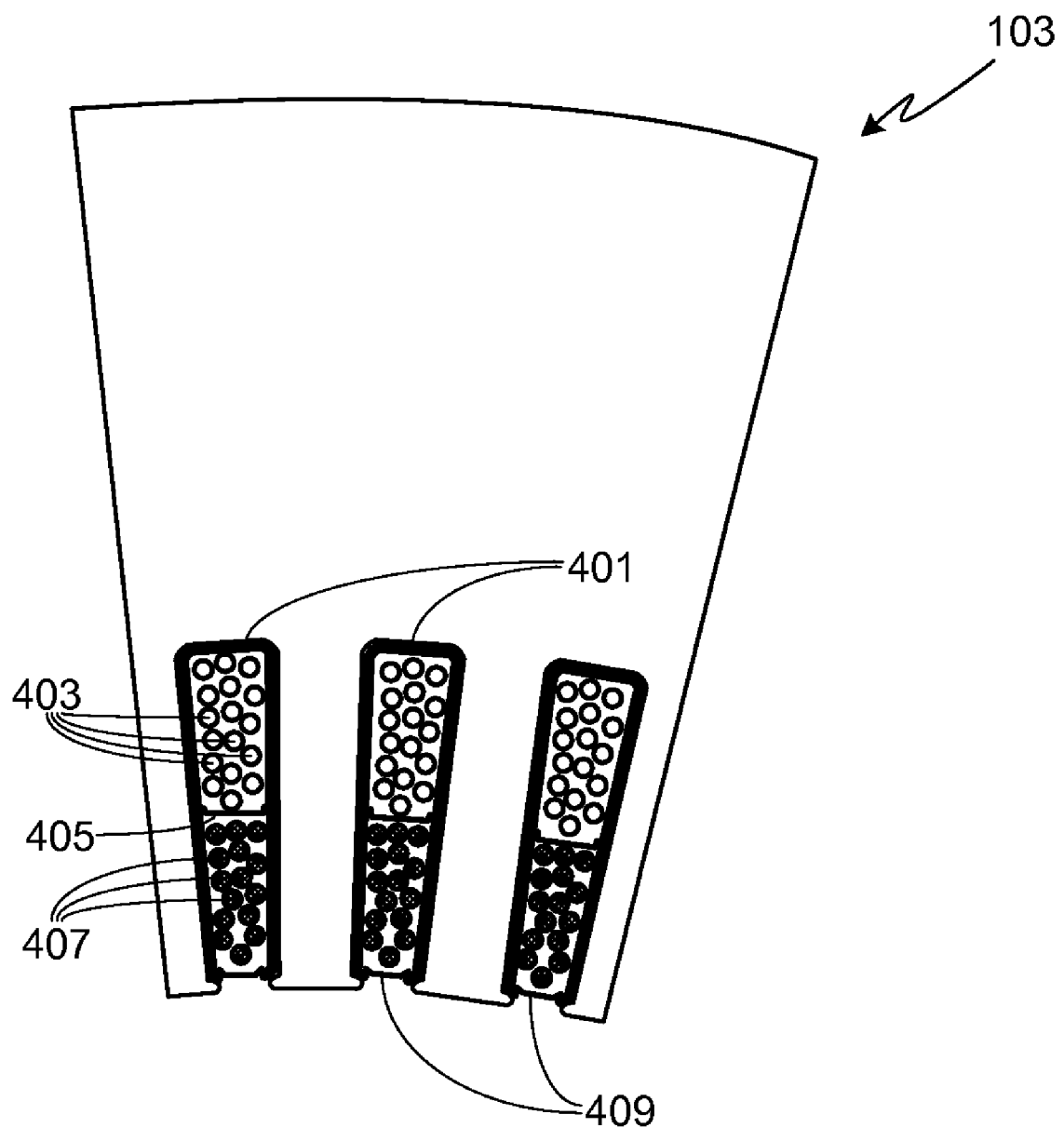
FIG. 4 provides the same view as that shown in FIG. 3, with the inclusion of winding layers.

FIG. 4 provides the same view of a portion of stator 103 as that shown in FIG. 3, except that windings are shown within the illustrated slots. Each stator winding may be comprised of a single wire, a solid conductor (i.e., non-wire shaped), or a bundle of wires (i.e., multiple wire strands as shown). Prior to winding insertion, slot insulation liner 401 is inserted within each slot 119. Next, and assuming that slot 119 is to be filled with only two turns as preferred, the first turn of the first coil is inserted into the slot. In this example, this turn is comprised of a bundle of insulated wires 403. It will be appreciated by those of skill in the art that the number and gauge of wires 403 depend upon the desired motor characteristics. During fabrication, the next step requires that wires 403 be pushed, or otherwise compacted, into slot 119. After compaction, a phase insulation separator 405 is inserted within slot 119. If the first coil, comprised of wires 403, and the second coil, comprised of wires 407, are of the same phase, phase insulation separator 405 may not be required. Next, the second turn is inserted into slot 119, this turn being comprised of insulated wires 407. The second turn may be from the same coil group or a different coil group. After a second compaction step, a slot top wedge 409 is preferably inserted into slot 119 in order to ensure that the wires remain within the slot. Alternately, slot top wedge 409 may be replaced with an adhesive or similar material (e.g., potting or encapsulation material) to fix the windings in place.

Figure 5:
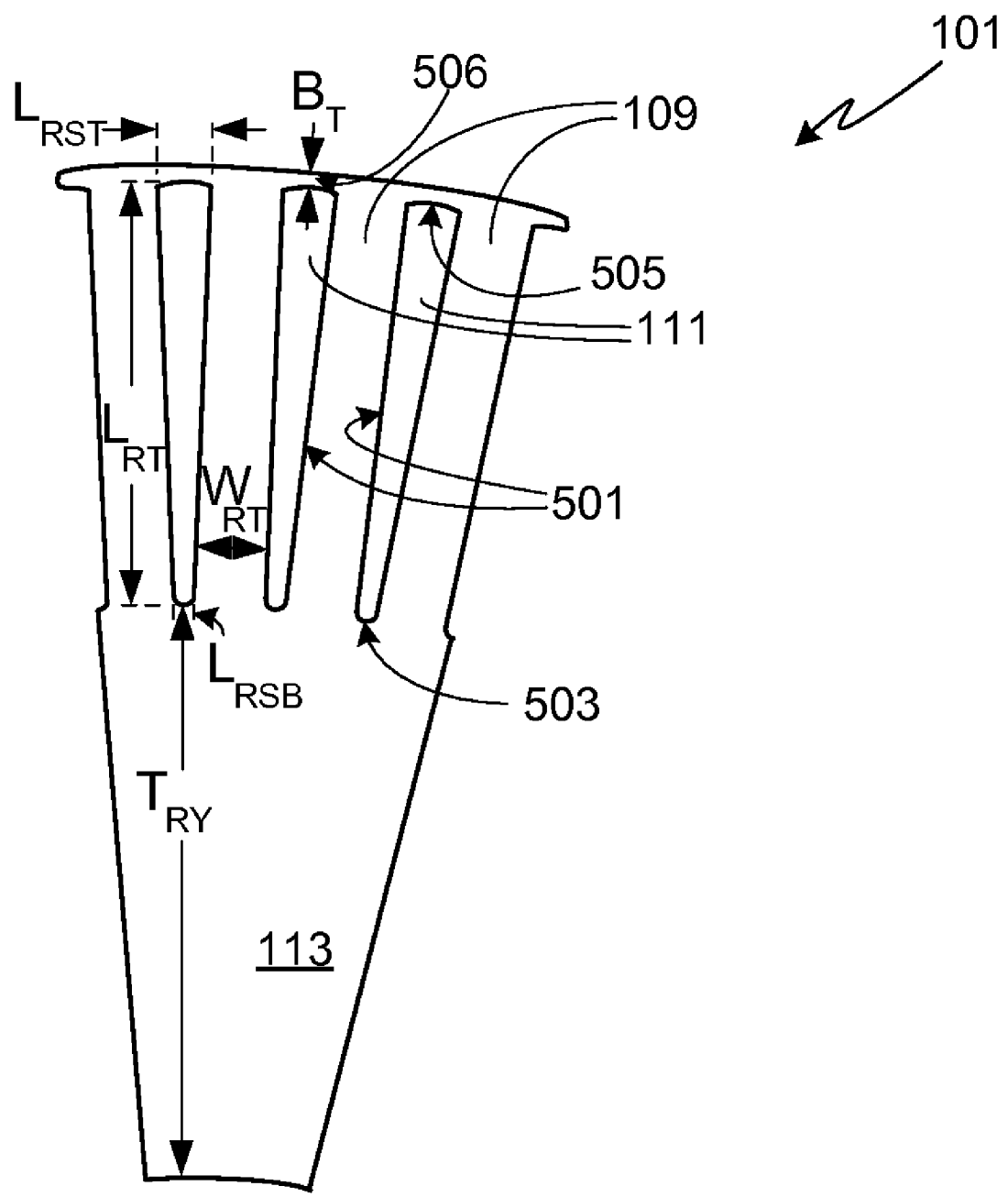
FIG. 5 shows a portion of the rotor shown in FIG. 1.
Figure 6:
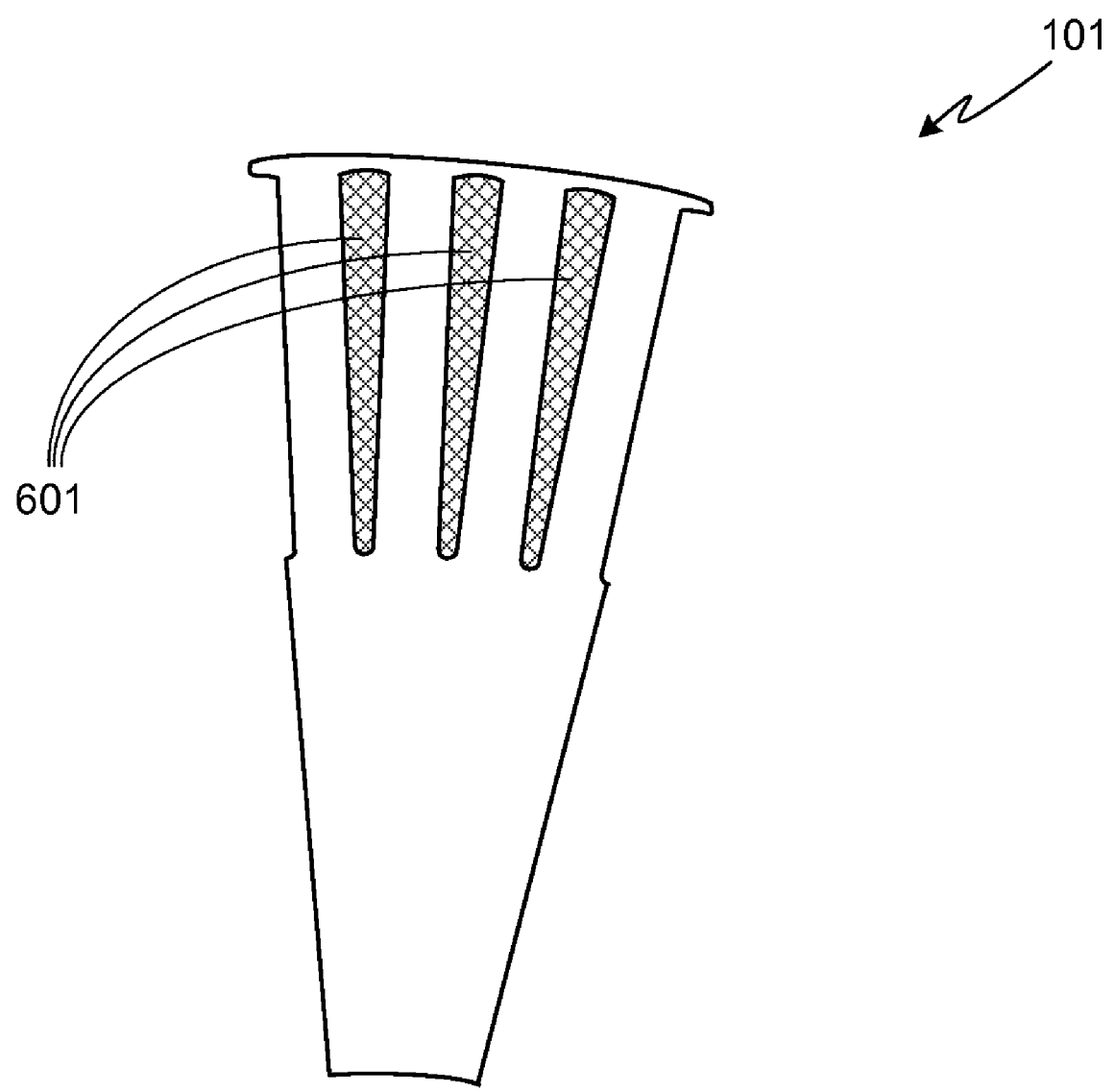
FIG. 6 provides the same view as that shown in FIG. 5, with the inclusion of a winding layer.

FIG. 5 shows a portion of rotor 101, specifically the portion taken along line 3-3 in FIG. 1. Rotor 101 includes a rotor yoke 113, rotor yoke 113 having a rotor yoke thickness $T_{RY}$. Coupled to rotor yoke 113 are a plurality of rotor teeth 109 that extend radially away from rotor center axis 203. Rotor teeth 109 have a common length $L_{RT}$. The side surfaces 501 of adjacent rotor teeth are parallel to one another. Due to the parallel surfaces 501 of teeth 109, the rotor slots 111 that are defined by teeth 109 are narrower at the bottom 503 of each slot than at the top 505, i.e., $L_{RSB} < L_{RST}$. Note that the bottom region 503 of each slot 111 is proximal to the rotor yoke 113 and the top region 505 of each slot is proximal to the stator 103. Preferably the bottom 503 of each slot is arcuate. Preferably the top 505 of each slot 111 is closed by a slot bridging section 506, also referred to herein as a bridge or a rotor tooth bridge. Bridge 506 has a thickness, $B_T$, which is between 10% and 70% larger than air gap 105. Preferably a single layer winding 601 comprising a solid conductor is disposed in slots 111 as shown in FIG. 6. Alternately, other numbers of layers, or configurations without layers, may be used. The material comprising windings 601 are preferably formed of one or more materials including, but not limited to, copper and aluminum.

Closing the top 505 of rotor slots 111 with bridging section 506 improves the mutual coupling of the stator and rotor electromagnetic fields as compared to a conventional, non-bridged design. The inventor has found that the disclosed rotor tooth bridges have higher average tangential component flux density than average radial component flux density and higher peak flux density magnitude than that of the stator teeth and that of the rotor teeth with the latter two being similar and both higher than that of the stator back-iron and that of the rotor back-iron.

Stators of the induction motors described herein have a higher ratio of stator yoke thickness, $T_{SY}$, to stator tooth width, $W_{ST}$, than used in a conventional induction motor. Rotors of the induction motors described herein have a higher ratio of rotor yoke thickness, $T_{RY}$, to rotor tooth width, $W_{RT}$, than used in a conventional induction motor. By increasing these ratios, the relative saturation levels of the yoke and the teeth for the rotor and the stator (i.e. the difference in the flux density level) is improved as compared to a conventional induction motor utilizing lower yoke thickness to tooth width ratios. For example, in an induction motor fabricated in accordance with the invention, the ratio of the yoke thickness to the tooth width for one or both of the stator and the rotor is on the order of 5:1 or more.

In at least one preferred embodiment, stator yoke thickness $T_{SY}$ is larger than the stator tooth length $L_{ST}$, preferably on the order of 30% to 70% larger. Similarly, in at least one preferred embodiment, rotor yoke thickness $T_{RY}$ is larger than the rotor tooth length $L_{RT}$, preferably on the order of 30% to 70% larger. In various embodiments, the sum of the stator yoke thickness $T_{SY}$ and the stator tooth length $L_{ST}$ is approximately equal to the sum of the rotor yoke thickness $T_{RY}$ and the rotor tooth length $L_{RT}$. Preferably, the length of each stator tooth, $L_{ST}$, is in the range of 4 to 6 time the width, $W_{ST}$, of each stator tooth. Similarly, in at least one preferred embodiment, the length of each rotor tooth, $L_{RT}$, is in the range of 4 to 6 time the width, $W_{RT}$, of each rotor tooth.

An induction motor fabricated in accordance with the invention preferably includes a large number of stator and rotor teeth. In at least one preferred embodiment, there are at least 15% more rotor teeth than stator teeth. For example, in the preferred embodiment shown in FIG. 1, there are 60 stator teeth and 74 rotor teeth. In at least one preferred embodiment, the ratio of stator tooth width, $W_{ST}$, to rotor tooth width, $W_{RT}$, is between 1:1 and 1.2:1.

In order to achieve the desired motor performance characteristics, preferably the lamination design described in detail above is used with a three-phase, four pole motor utilizing a two layer winding. It will be appreciated that the invention may be used with patterns utilizing more than two layers, but a two layer design has proven to be optimal when considering performance and manufacturability. Preferably, the total number of winding coil turns per pole per phase is no more than the total number of stator slots divided by the product of the number of phases and the number of pole-pairs. In an exemplary two layer design, each of the first and second winding layers is comprised of the coil groups for six individual poles, two per phase. Within each layer, the two poles per phase are members of a pole pair, thereby forming the complementary poles (e.g., north and south poles) of an electromagnet. Thus, for example, the first layer would include poles A1 and A2 of phase A while the second layer would include poles A3 and A4 of phase A, where poles A1 and A2 comprise a first pole pair and poles A3 and A4 comprise a second pole pair, both pole pairs associated with the same phase. Utilizing this approach, and as described and illustrated below, each winding layer can be fabricated utilizing an only slightly modified concentric winding technique, thus lending itself to automation.

FIGS. 7-20 illustrate a preferred embodiment utilizing the previously described laminations. This configuration utilizes a 60-slot stator as shown in FIG. 1. It should be understood, however, that the invention is not limited to a 60-slot stator, rather, the inventor has found that this configuration yielded the desired motor performance without becoming too complex for automation. Other exemplary configurations utilize 48-slot stators (i.e., coil groups with 4 coils per group) and 72-slot stators (i.e., coil groups with 6 coils per group).

FIG. 7 illustrates the coil make-up for each winding layer with the phase designators for each second layer coil being italicized and in bold. As shown, in this embodiment each coil group is comprised of five coils. Within each coil group there are two double-turn coils. More specifically and as shown, the first outermost coil and the second outermost coil of each group is a double-turn coil. It will be appreciated that during fabrication of a single winding layer there is no overlap between coil groups in that layer. Note that as used throughout this specification, the first winding layer, also simply referred to as the first layer, indicates the first set of coils inserted into the stator slots, where the first set of coils is comprised of the coil groups for six poles, two from each phase. Similarly, the second winding layer, also simply referred to as the second layer, indicates the second set of coils inserted into the stator slots, where the second set of coils is comprised of the coil groups for the remaining six poles, two from each phase.

The small number of turns, in combination with other aspects of the disclosed design, results in a high electric potential drop within each coil spanning a complete pole giving rise to the preferred flux density distribution and in particular and as discussed elsewhere herein, the high flux density in certain locations of the lamination even at the high speed operating range. As a result, in combination with the other aspects of the improved design, a wide constant peak power range can be attained at the high speed range. A general consequence of the low number of turns is the increased stator winding phase currents as well as a corresponding increase in the rotor bar currents; however, the resulting increase in the copper losses in the stator and the rotor has been compensated in general by the significant reduction in both the stator winding resistances and the rotor bar resistances.

FIG. 8 provides the coil winding information for each coil of the preferred embodiment shown in FIG. 7. FIG. 8, however, provides the specific stator slots for each coil, and thus the span distance for each coil. For example, coil 1 of phase A goes from slot 1 to slot 15, spanning a distance of 14 slots. Similarly, coil 4 of phase A goes from slot 30 to slot 16, therefore also spanning a distance of 14 slots. The direction of winding for these two coils, however, are opposite from one another, thus establishing opposing magnetic poles. Note that the winding direction is indicated by the negative sign in front of the span distance (e.g., as shown in the span columns for coil groups A2 and A4).

Figure 9:
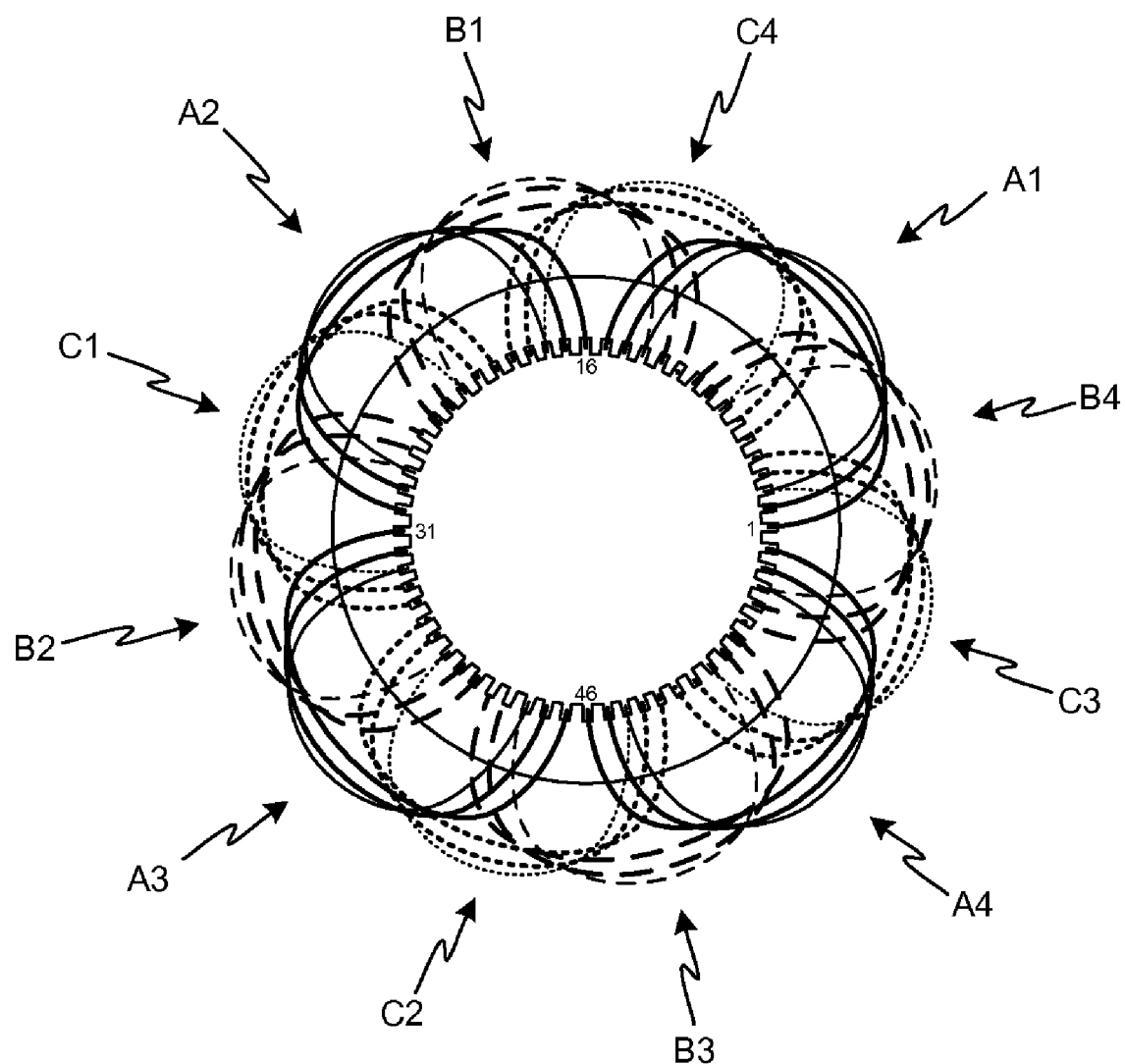
FIG. 9 diagrammatically illustrates the coil configuration for each phase of the preferred embodiment shown in FIG. 7.

The configuration shown in FIGS. 7 and 8 is also illustrated in FIG. 9 which diagrammatically illustrates the coil configuration for each phase. As shown, coil groups A1 and A2 are members of one pole pair, i.e., they oppose each other in an electromagnetic sense, while coil groups A3 and A4 comprise a second pole pair. Note that coil groups A1 and A2 are part of the first winding layer while coil groups A3 and A4 are part of the second winding layer. Similarly, for the second phase coil groups B1 and B2 are members of one pole pair and coil groups B3 and B4 comprise a second pole pair. Similarly, for the third phase coil groups C1 and C2 are members of one pole pair and coil groups C3 and C4 comprise a second pole pair. Note that in this figure the double turn coils are shown in bold.

Figure 10:
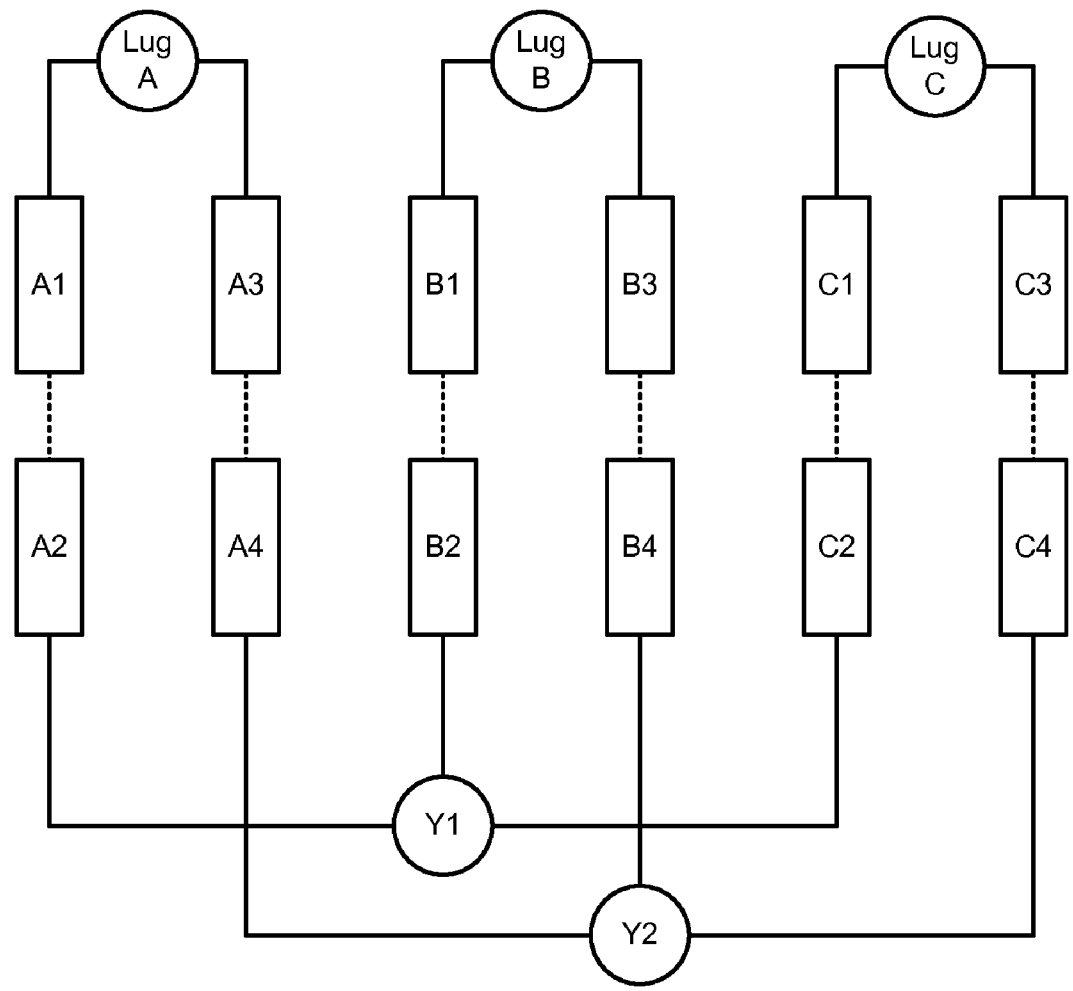
FIG. 10 illustrates the inter-pole connections of the three-phase, four pole motor of the present invention.

It will be appreciated that due to the winding approach provided by the invention, the inter-pole connections are accomplished during the winding and coil insertion process, not after coil insertion as is common in prior art winding patterns. Thus, for example, the same continuous wire or wire bundle is used to first form the coils in the A1 coil group, and then the coils in the A2 coil group, thereby automatically forming the inter-pole connection during fabrication of the winding layer and eliminating the need for post-insertion fabrication of the inter-pole connection between these two coil groups. The elimination of the post-insertion inter-pole connection steps simplifies motor production, thus reducing cost and motor complexity while improving motor reliability and quality. These same inter-pole connections are also illustrated in FIG. 10, this figure providing the coil group connections for the four pole, three-phase configurations of the present invention.

Figure 11:
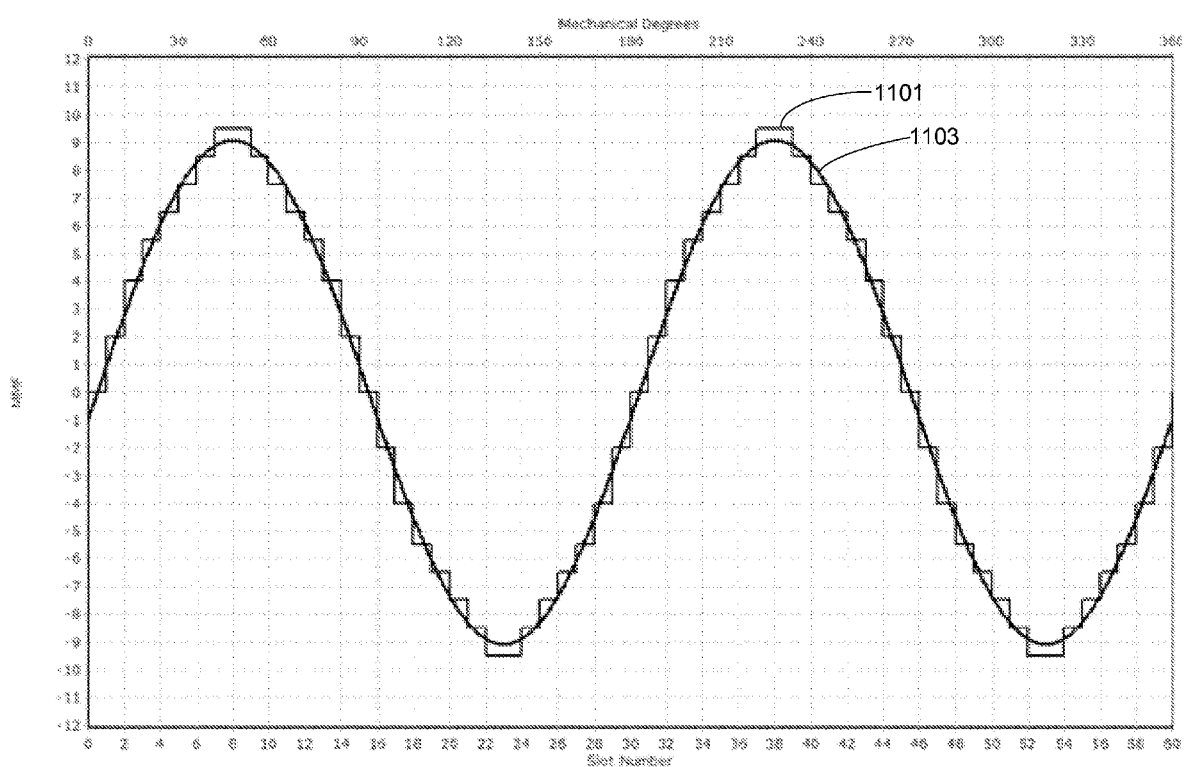
FIG. 11 illustrates the total MMF distribution and its fundamental component for the preferred embodiment.

FIG. 11 is a diagram illustrating the distribution of the total magneto-motive-force (MMF) 1101 of a phase of the exemplary embodiment. In addition to showing the effective total MMF with the slot effect, the fundamental component 1103 is shown. In general, the near sinusoidal distribution winding MMF is instrumental in reducing the harmonic losses in the motor which, in turn, improves motor efficiency and reduces torque ripples. The low harmonic content in the winding MMF is a combined result of the high number of stator slots per pole per phase and the winding pattern design.

Figure 12:
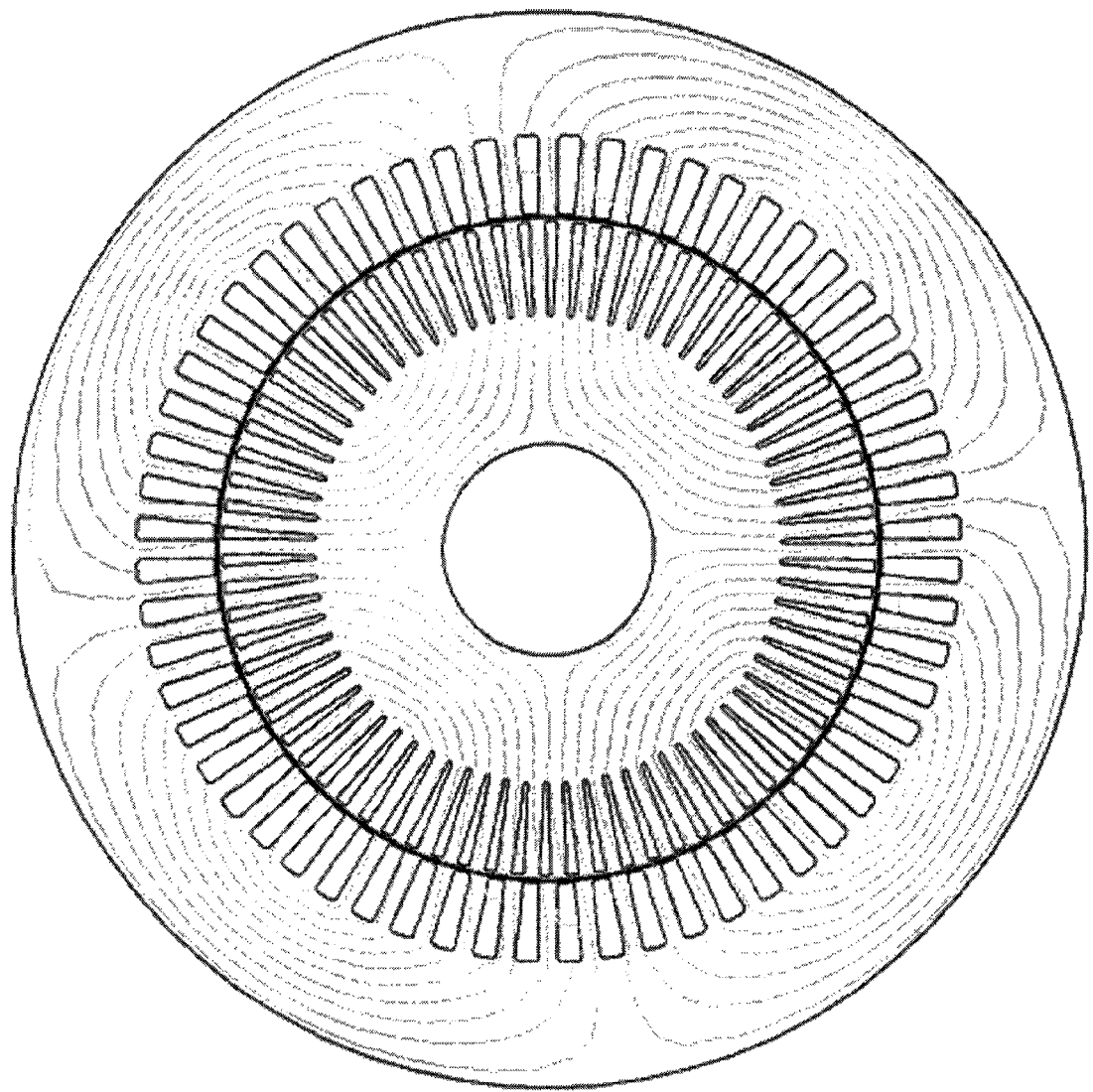
FIG. 12 is a diagram illustrating the flux distribution of an induction motor lamination.

FIG. 12 is a diagram illustrating the flux density distribution of an induction motor lamination of the exemplary motor design for an example operating point. The flux distribution pattern does not substantially change throughout the operating range (such as dictated by the motor torque and speed), even though the flux density magnitude and direction may vary depending on the levels of saturation in various locations of the lamination. As a result of the improved design of the invention, the electromagnetic characteristics, including flux density distribution, remain substantially unchanged throughout a wide range of operating points, including but not limited to the peak torque operating points throughout the low and high speed ranges. It will be appreciated by those of skill in the art that (i) the smaller distances among the flux lines indicate higher flux densities and vice versa, (ii) the flux distribution is a combined effect of the stator and rotor winding currents, and (iii) the flux distribution pattern is rotating co-axially around the center at a frequency that is synchronous with the stator winding excitation frequency and asynchronous with the rotor rotational frequency.

Figure 13:
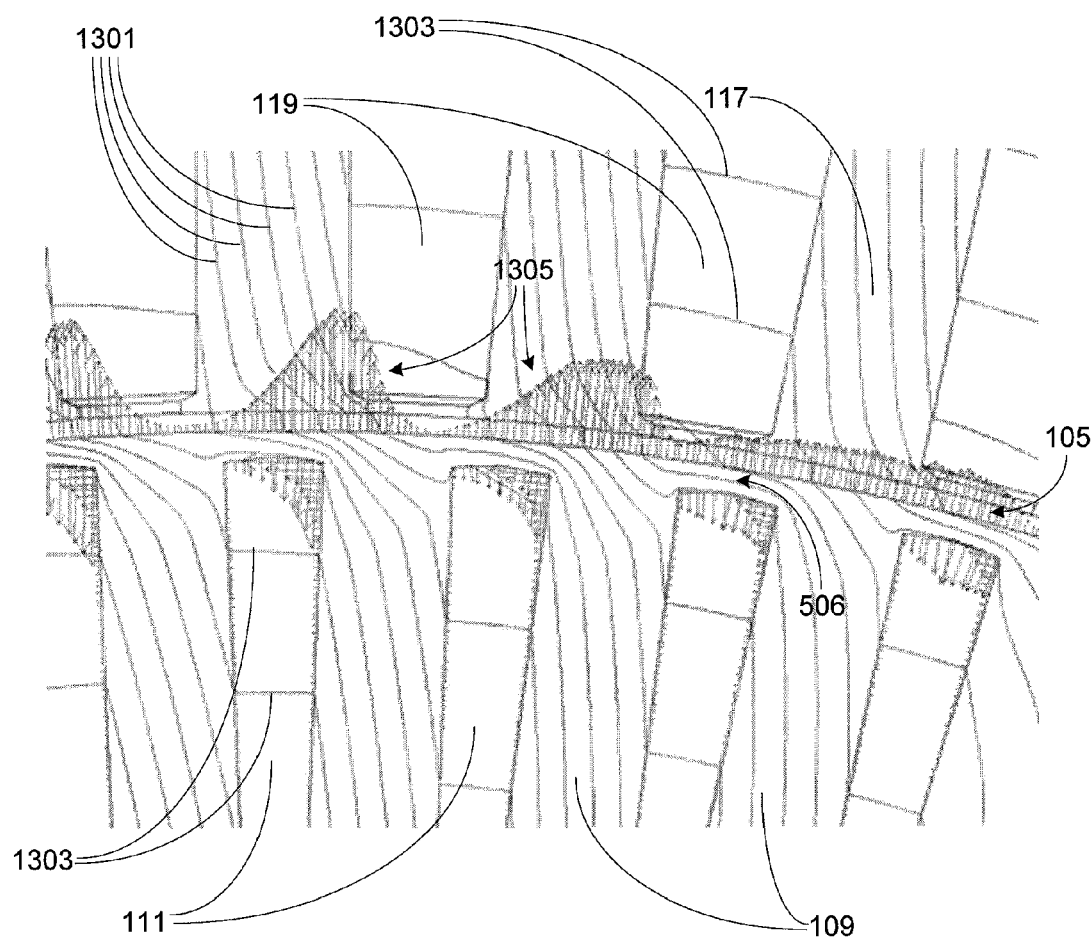
FIG. 13 is a diagram illustrating the flux distribution in and around the air gap, and the magnetic force distribution on the rotor bridges and rotor slots, of the preferred embodiment.

A more detailed flux distribution in and around the air gap 105 is provided in FIG. 13. As shown, the flux lines 1301 enter and exit the air-gap in near perpendicular manner as a characteristic of the magnetic permeability boundary change between the steel and the air domains. As can also be seen in this detailed figure, most of the flux lines 1301 are confined to the steel teeth which are much more magnetically permeable than the copper coils and the air, and conduct substantially but not completely parallel to the sides of the steel teeth. Some slot leakage flux lines 1303 can be seen crossing the stator slots 119 and the rotor slots 111 substantially perpendicular to the sides of the steel teeth. The flux lines in and around the rotor tooth bridges 506 are particularly important.

FIG. 13 also shows the magnetic stress distribution 1305 that results from the flux distribution and is computed by the Maxwell stress tensor method. It can be understood that the majority of the resultant shaft torque is a combined total effect of the magnetic stress distributed on the side surfaces of all of the rotor teeth, some of which are shown in the FIG. 13, with the higher magnitude vectors pointing in the rotor rotational direction (which is counter-clock wise in this example). An objective of the present design is to maximize the magnitude of these vectors with all the other design constraints and considerations, hence improving torque density per unit rotor volume and per unit stator phase current.

Also shown in FIG. 13 are the magnetic stress vectors under the rotor tooth bridges 506 that are relatively high in comparison to the torque producing magnetic stress on the rotor tooth sides, described above. These stresses push down on the rotor bars in the rotor slots, countering the centrifugal forces experienced by the rotor bars in the rotating rotor, which is especially useful in allowing the high speed operation of the motor where the centrifugal forces can be very high and detrimental to the mechanical integrity of the steel laminations as well as the copper or aluminum bars and the rotor bar end-rings. The detrimental centrifugal forces may be compounded by the thermal expansion forces and the thermal expansion coefficient mismatch among the adjacent materials, making the high speed high temperature operation among the worst cases of operation. The high countering magnetic stresses provided by the fully closed rotor tooth bridges as well as the thick bridge design protect against potential yield and fatigue damages, thereby improving reliability.

FIG. 13 also shows the magnetic stresses perpendicular to the rotor surface and pointing radially towards air gap 105, these stresses contributing to the detrimental radial forces pulling on the rotor laminations that are circling around the air gap to the stator. Negative effects associated with such radial stresses include vibration, acoustic noise and dynamic eccentricity. Fortunately these effects are minimized by the improved radial stress distribution design that spreads the stress magnitudes, as well as the selection of a high number of rotor teeth and the use of thick rotor tooth bridges.

Figure 14A:
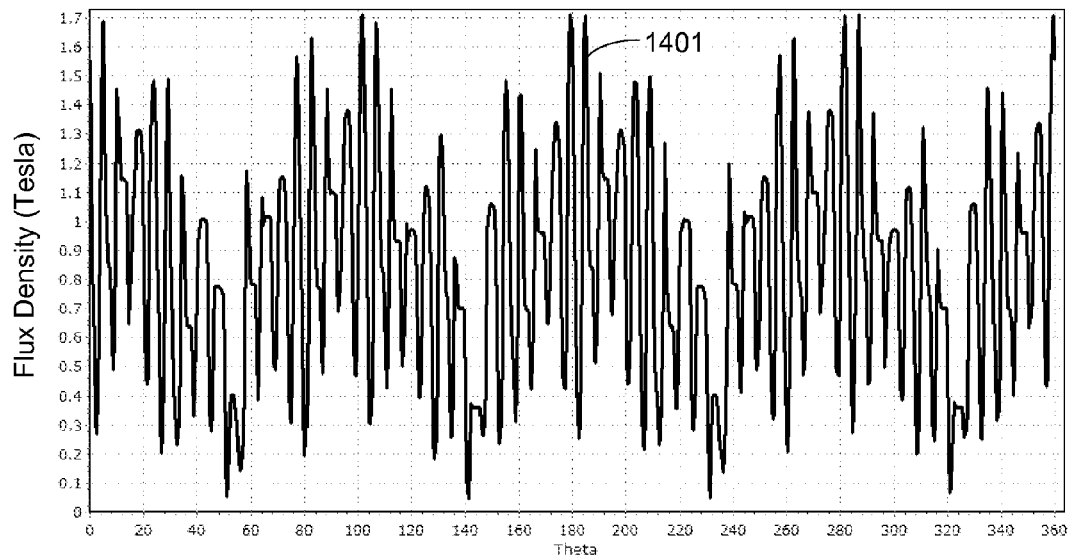
FIGS. 14A and 14B illustrates the magnitudes of the air gap flux densities and the rotor tooth bridge flux densities, respectively.
Figure 14B:
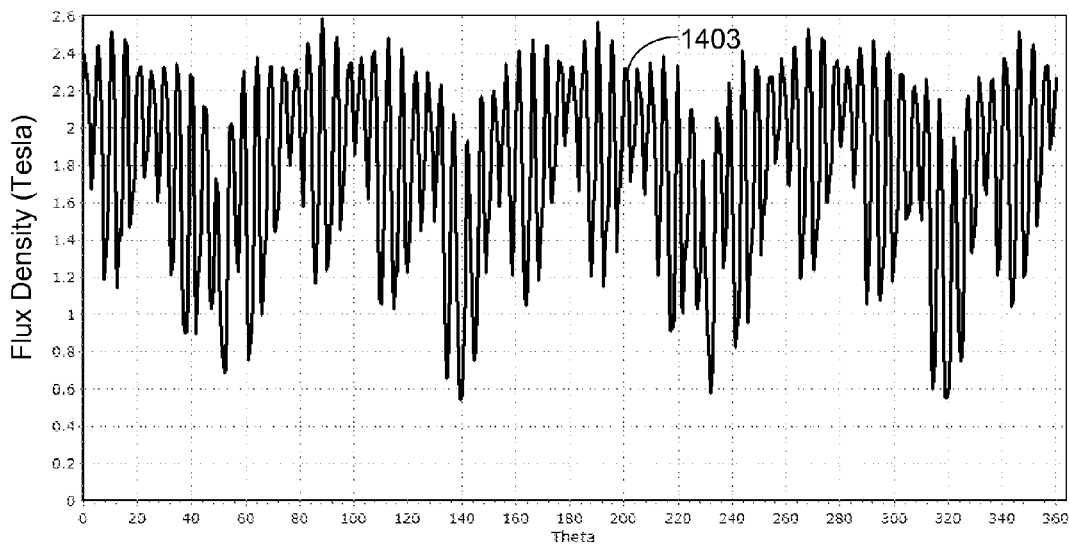

Corresponding to the flux distribution as shown in FIG. 13, FIGS. 14A and 14B shows the magnitudes of the air gap flux densities in the middle of the air gap along the complete air gap circumferential (curve 1401 of FIG. 14A) and rotor tooth bridge flux densities in the middle of the rotor tooth bridges along the complete rotor circumferential (curve 1403 of FIG. 14B). Preferably, the rotor tooth saturation level is designed to be very high throughout a wide operational range. For the exemplary design described above, the peak flux densities in the air gap and in the rotor tooth bridges are around 1.6 Tesla and 2.4 Tesla, respectively, as shown. The average flux densities in the air gap and in the rotor tooth bridges are around 0.8 Tesla and 1.8 Tesla, respectively. The high frequency ripples visible in the flux densities shown in FIGS. 14A and 14B are the combined effects of the stator and rotor slotting as well as other non-ideal secondary effects.

The positioning and the particular sizing of the rotor tooth bridges in relation to the adjacent stator and rotor teeth and the air gap size are critical in dictating the saturation levels as well as the directional properties of the flux densities in the rotor tooth bridges. In a preferred embodiment, and as noted above, the rotor tooth bridge thickness 506 is between 10% and 70% greater than the size of air gap 105, where the preferred air gap size is between 0.5 millimeters and 0.8 millimeters. This is in contrast to a conventional high efficiency induction motors where the air gap size is typically as small as mechanically possible, i.e., less than 0.5 millimeters. The inventor has found that utilizing the present design, the relatively large air gap size reduces the stator and rotor leakage fluxes, contributes to the improved high speed peak torque capability, and improves the high speed constant power range while reducing precision balancing and stringent dimensional tolerance requirements for high speed operations.

Figure 15A:
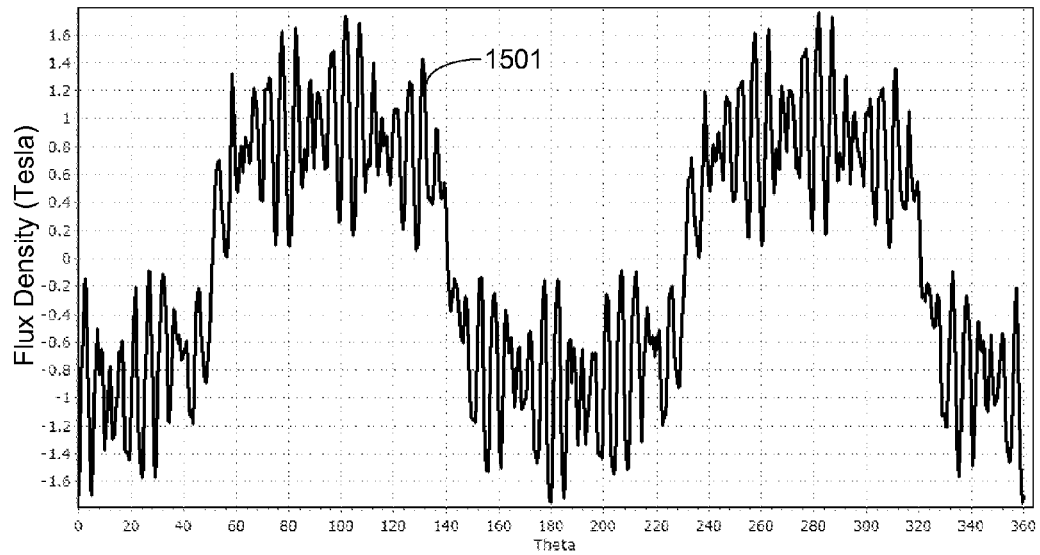
FIGS. 15A and 15B illustrates the rotor bridge flux densities in the radial and tangential directions, respectively.
Figure 15B:
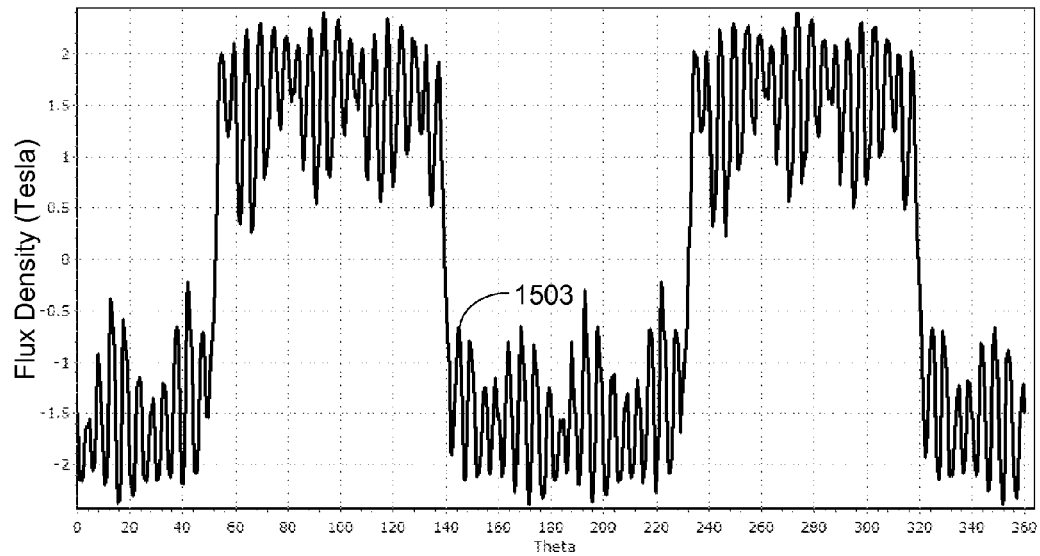

Curves 1501 and 1503 of FIGS. 15A and 15B further illustrate the radial and tangential components, respectively, of the flux densities in the rotor tooth bridges. As shown, the tangential components are significantly greater than the radial components. This consistent property, designed throughout virtually the entire motor operational range, helps to reduce leakage fluxes and leakage inductances, improves magnetizing inductance and power factor, and improves desirable torque producing magnetic stresses and torque density.

Figure 16:
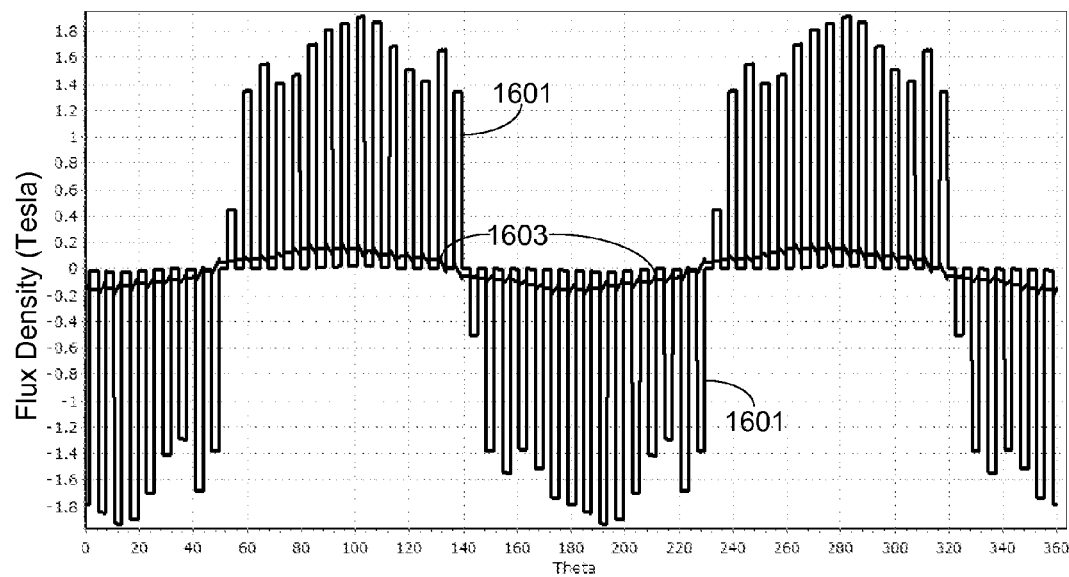
FIG. 16 illustrates the stator tooth flux densities in the radial and tangential directions.

FIG. 16 shows the stator tooth flux densities in the radial (curve 1601) and the tangential (curve 1603) directions at circumferential locations around the middle of the stator teeth as well as of the stator slots. As previously described, and as shown here, the radial components are significantly larger than the tangential components. As further shown in FIG. 17, the resultant peak and average flux density magnitudes at these positions and at virtually all stator tooth locations are substantially lower than those of the rotor tooth bridges and substantially higher than those of the air gap, both of which are shown in FIGS. 14A/B.

Figure 17:
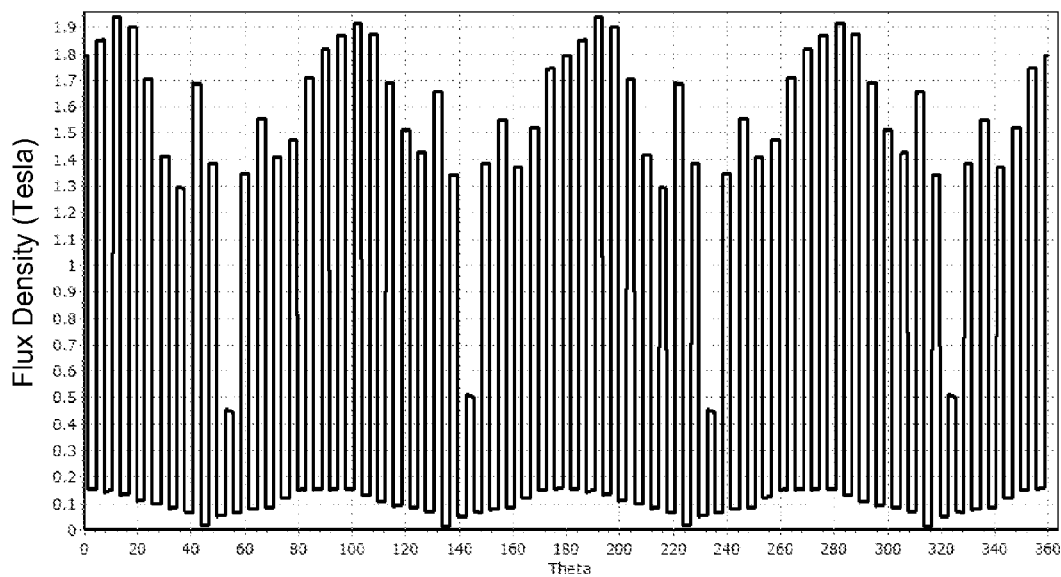
FIG. 17 illustrates the stator tooth peak and average flux density magnitudes.
Figure 18:
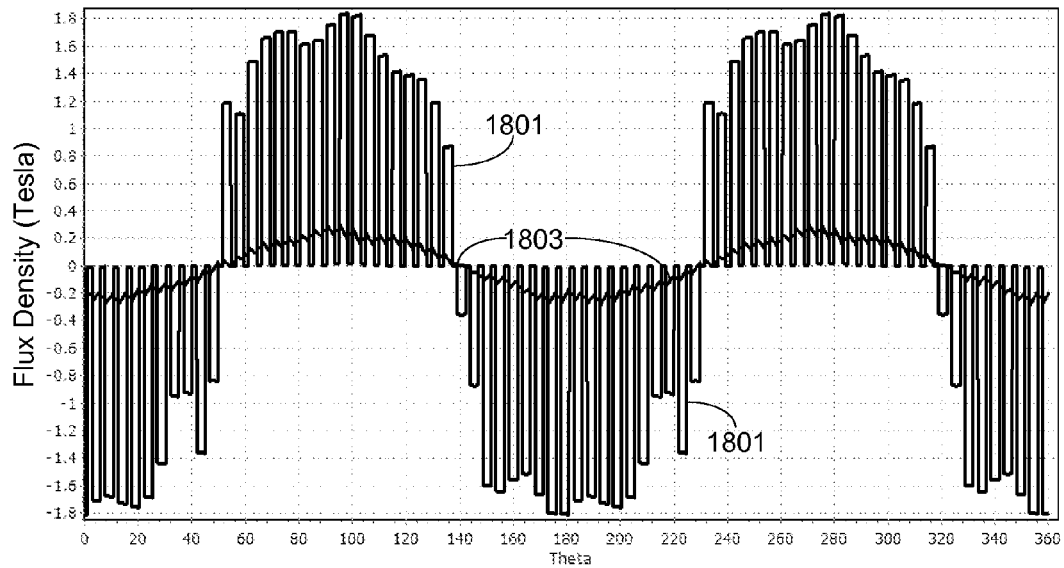
FIG. 18 illustrates the rotor tooth flux densities in the radial and tangential directions.

FIG. 18 shows the rotor tooth flux densities in the radial (curve 1801) and the tangential (curve 1803) directions at circumferential locations around the middle of the rotor teeth as well as of the rotor slots. As previously described, and as shown here, the radial components are significantly larger than the tangential components. As further shown in FIG. 19, the resultant peak and average flux density magnitudes at these positions and at virtually all rotor tooth locations are substantially lower than those of the rotor tooth bridges and substantially higher than those of the air gap, both of which are shown in FIG. 14, and further are substantially similar to those of the stator teeth as shown in FIG. 17.

Figure 19:
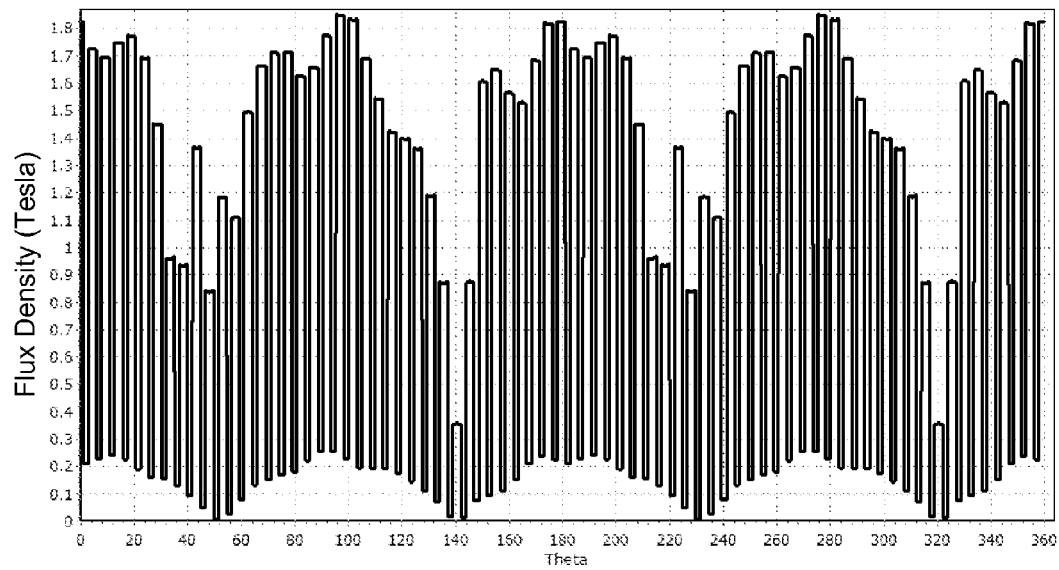
FIG. 19 illustrates the rotor tooth peak and average flux density magnitudes.
Figure 20:
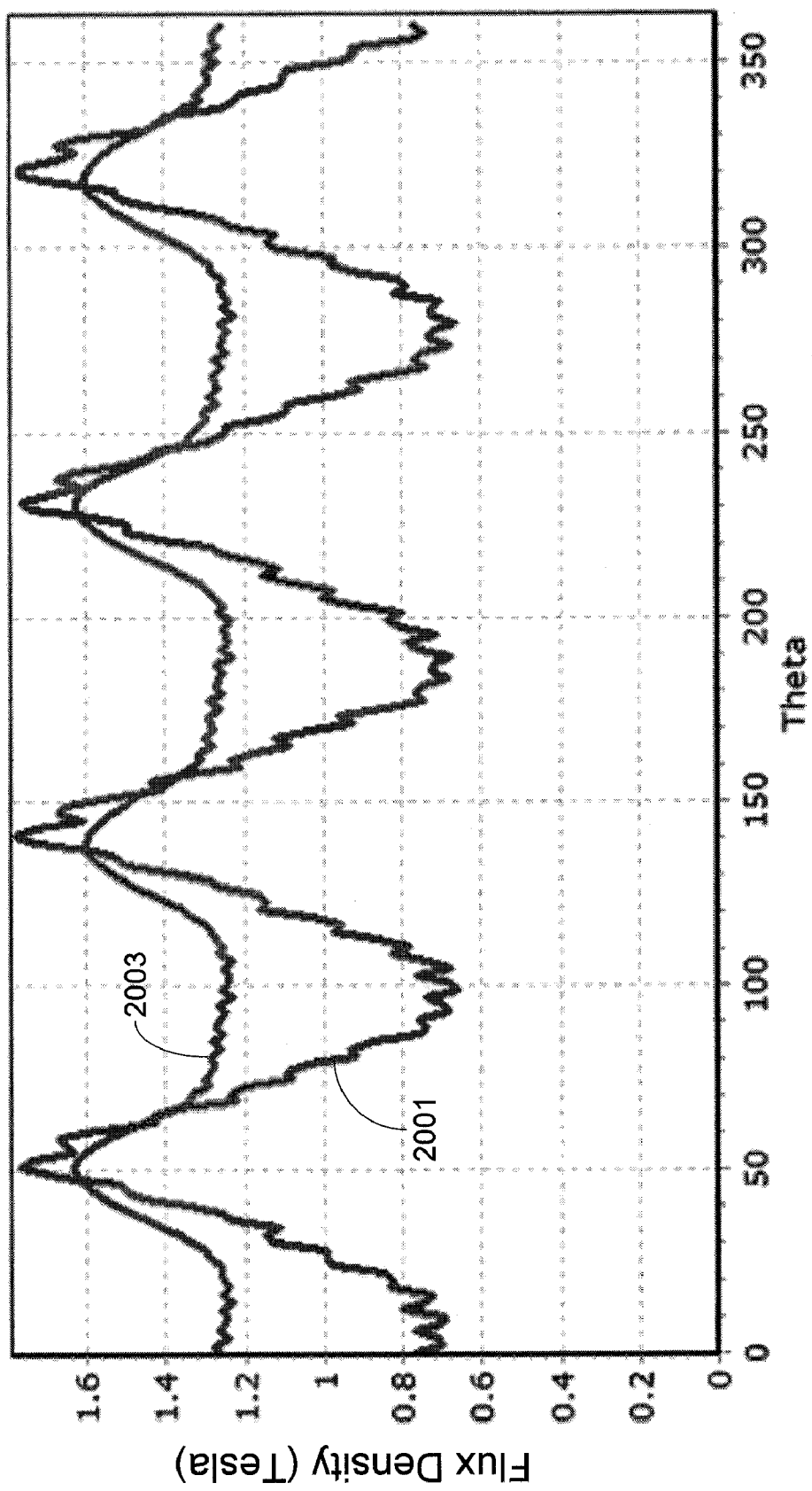
FIG. 20 illustrates the stator back-iron flux density magnitude and the rotor back-iron flux density magnitude.

FIG. 20 shows the stator back-iron flux density magnitude (curve 2001) and the rotor back-iron flux density magnitude (curve 2003) at circumferential locations around the middle of the stator back-iron and the middle of the rotor back-iron, respectively. The peak and average flux density magnitudes at these positions and at virtually all stator back-iron and rotor back-iron locations are lower than those of the stator teeth as shown in FIG. 17, and lower than those of the rotor teeth as shown in FIG. 19.

In the accompanying figures, it should be understood that identical element symbols used on multiple figures refer to the same component, or components of equal functionality. Additionally, the accompanying figures are only meant to illustrate, not limit, the scope of the invention.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An induction motor, comprising:
    a stator defining a stator bore, said stator comprising:
        a stator yoke having a stator yoke thickness; and
        a plurality of stator teeth extending radially inward toward a stator center axis, wherein said plurality of stator teeth have a common stator tooth length, wherein each stator tooth defines a pair of stator tooth side surfaces, and wherein said pair of stator tooth side surfaces for each stator tooth of said plurality of stator teeth are parallel to one another;
        a plurality of stator slots, wherein each of said plurality of stator slots is interposed between a corresponding pair of stator teeth;
        a first winding layer contained within at least a first subset of said plurality of slots, wherein said first winding layer is comprised of a first set of six coil groups, wherein said first set of six coil groups is comprised of a first and second first phase coil group, a first and a second second phase coil group, and a first and a second third phase coil group;
        a second winding layer contained within at least a second subset of said plurality of slots, wherein said second winding layer is comprised of a second set of six coil groups, wherein said second set of six coil groups is comprised of a third and a fourth first phase coil group, a third and a fourth second phase coil group, and a third and a fourth third phase coil group; and
        wherein said first and second first phase coil groups comprise a first pole pair of said first phase, wherein said third and fourth first phase coil groups comprise a second pole pair of said first phase, wherein said first and second second phase coil groups comprise a first pole pair of said second phase, wherein said third and fourth second phase coil groups comprise a second pole pair of said second phase, wherein said first and second third phase coil groups comprise a first pole pair of said third phase, and
        wherein said third and fourth third phase coil groups comprise a second pole pair of said third phase; and
    a rotor mounted within said stator bore, said rotor comprising:
        a rotor yoke having a rotor yoke thickness;
        a plurality of rotor teeth extending radially away from a rotor center axis, wherein said plurality of rotor teeth have a common rotor tooth length, wherein each rotor tooth defines a pair of rotor tooth side surfaces, wherein said pair of rotor tooth side surfaces for each rotor tooth of said plurality of rotor teeth are parallel to one another; and
        a plurality of rotor slots, wherein each of said plurality of rotor slots is interposed between a corresponding pair of rotor teeth, wherein a top region of each rotor slot that is proximate to said stator is closed by a rotor tooth bridge.

2. The induction motor of claim 1, wherein said stator has a stator diameter and a stator length, and wherein a ratio of said stator diameter to said stator length is at least 1.5:1.

3. The induction motor of claim 1, said stator further comprising a plurality of stator slots, wherein each of said plurality of stator slots is interposed between a corresponding pair of stator teeth, wherein each stator tooth side surface further comprises an extended lip portion proximate to said stator bore, wherein said extended lip portion of each stator tooth side surface partially extends away from said stator tooth side surface and across a portion of the corresponding stator slot.

4. The induction motor of claim 1, wherein said stator yoke thickness is between 30% and 70% larger than said common stator tooth length.

5. The induction motor of claim 1, wherein said rotor yoke thickness is between 30% and 70% larger than said common rotor tooth length.

6. The induction motor of claim 1, wherein a sum of said stator yoke thickness and said common stator tooth length is approximately equal to a sum of said rotor yoke thickness and said common rotor tooth length.

7. The induction motor of claim 1, wherein said plurality of stator teeth have a common stator tooth width, and wherein said common stator tooth length is between 4 and 6 times said common stator tooth width.

8. The induction motor of claim 1, wherein said plurality of rotor teeth have a common rotor tooth width, and wherein said common rotor tooth length is between 4 and 6 times said common rotor tooth width.

9. The induction motor of claim 1, wherein said plurality of stator teeth have a common stator tooth width, wherein said plurality of rotor teeth have a common rotor tooth width, and wherein a ratio of said common stator tooth width to said common rotor tooth width is between 1:1 and 1.2:1.

10. The induction motor of claim 1, wherein an air gap distance between said stator bore and said rotor is between 0.5 millimeters and 0.8 millimeters.

11. The induction motor of claim 10, wherein said rotor tooth bridge corresponding to each rotor slot is between 10% and 70% larger than said air gap distance.

12. The induction motor of claim 1, wherein said plurality of rotor teeth comprise a total number of rotor teeth, wherein said plurality of stator teeth comprise a total number of stator teeth, and wherein said total number of rotor teeth is at least 15% higher than said total number of stator teeth.

13. The induction motor of claim 1, wherein said plurality of stator teeth is comprised of 60 stator teeth.

14. The induction motor of claim 1, wherein said plurality of rotor teeth is comprised of 74 rotor teeth.

15. The induction motor of claim 1, further comprising:
a first inter-pole connection electrically connecting said first first phase coil group to said second first phase coil group, wherein said first first phase coil group and said second first phase coil group are formed from a first continuous wire or wire bundle such that said first inter-pole connection is automatically formed during fabrication of said first winding layer, and wherein said automatic formation of said first inter-pole connection eliminates post-insertion fabrication of said first inter-pole connection;
a second inter-pole connection electrically connecting said first second phase coil group to said second second phase coil group, wherein said first second phase coil group and said second second phase coil group are formed from a second continuous wire or wire bundle such that said second inter-pole connection is automatically formed during fabrication of said first winding layer, and wherein said automatic formation of said second inter-pole connection eliminates post-insertion fabrication of said second inter-pole connection;
a third inter-pole connection electrically connecting said first third phase coil group to said second third phase coil group, wherein said first third phase coil group and said second third phase coil group are formed from a third continuous wire or wire bundle such that said third inter-pole connection is automatically formed during fabrication of said first winding layer, and wherein said automatic formation of said third inter-pole connection eliminates post-insertion fabrication of said third inter-pole connection;
a fourth inter-pole connection electrically connecting said third first phase coil group to said fourth first phase coil group, wherein said third first phase coil group and said fourth first phase coil group are formed from a fourth continuous wire or wire bundle such that said fourth inter-pole connection is automatically formed during fabrication of said second winding layer, and wherein said automatic formation of said fourth inter-pole connection eliminates post-insertion fabrication of said fourth inter-pole connection;
a fifth inter-pole connection electrically connecting said third second phase coil group to said fourth second phase coil group, wherein said third second phase coil group and said fourth second phase coil group are formed from a fifth continuous wire or wire bundle such that said fifth inter-pole connection is automatically formed during fabrication of said second winding layer, and wherein said automatic formation of said fifth inter-pole connection eliminates post-insertion fabrication of said fifth inter-pole connection; and
a sixth inter-pole connection electrically connecting said third third phase coil group to said fourth third phase coil group, wherein said third third phase coil group and said fourth third phase coil group are formed from a sixth continuous wire or wire bundle such that said sixth inter-pole connection is automatically formed during fabrication of said second winding layer, and wherein said automatic formation of said sixth inter-pole connection eliminates post-insertion fabrication of said sixth inter-pole connection.

16. The induction motor of claim 1, wherein each coil group of said first set of six coil groups and said second set of six coil groups is comprised of five coils.

17. The induction motor of claim 1, wherein each coil group of said first and second winding layers is comprised of a plurality of coils, and wherein each plurality of coils is comprised of a first double turn coil and a second double turn coil.

18. The induction motor of claim 17, wherein said first double turn coil for each coil group of said first and second winding layers corresponds to an outermost coil position for that coil group, and wherein said second double turn coil for each coil group of said first and second winding layers corresponds to a coil position adjacent to said outermost coil position for that coil group.

* * * * *